United States Patent [19]

Kolpacke

[11] Patent Number: 5,184,480
[45] Date of Patent: Feb. 9, 1993

[54] ACCUMULATOR FOR VEHICLE AIR CONDITIONING SYSTEM

[75] Inventor: Stephen M. Kolpacke, Canton, Mich.

[73] Assignee: Ford Motor Company, Dearborn, Mich.

[21] Appl. No.: 812,169

[22] Filed: Dec. 23, 1991

[51] Int. Cl.$^5$ .............................................. F25B 43/00
[52] U.S. Cl. .................................... 62/503; 55/387; 210/282; 210/DIG. 6
[58] Field of Search ................ 62/503; 55/387; 210/282, DIG. 6

[56] References Cited

U.S. PATENT DOCUMENTS

| | | | |
|---|---|---|---|
| 1,978,463 | 10/1934 | Kettering | 62/115 |
| 3,092,978 | 6/1963 | Lorentzen | 62/216 |
| 3,438,218 | 4/1969 | O'Neil | 62/218 |
| 3,488,678 | 1/1970 | Wagner | 62/503 |
| 3,563,053 | 2/1971 | Bottum | 62/503 |
| 3,643,466 | 2/1972 | Bottum | 62/503 |
| 3,796,064 | 3/1974 | Ladusaw | 62/503 |
| 3,798,921 | 3/1974 | Scherer et al. | 62/217 |
| 3,837,173 | 9/1974 | Kuttruff et al. | 62/128 |
| 3,837,177 | 9/1974 | Rockwell et al. | 62/503 |
| 3,957,469 | 5/1976 | Nebash | 55/270 |
| 4,111,005 | 9/1978 | Livesay | 62/503 |
| 4,122,579 | 10/1978 | Parise | 15/353 |
| 4,147,479 | 4/1979 | Morse | 417/540 |
| 4,182,136 | 1/1980 | Morse | 62/503 |
| 4,187,695 | 2/1980 | Schumacher | 62/503 |
| 4,199,960 | 4/1980 | Adams et al. | 62/503 |
| 4,236,381 | 12/1980 | Imral et al. | 62/324 R |
| 4,266,408 | 5/1981 | Krause | 62/474 |
| 4,270,934 | 6/1981 | Widdowson et al. | 55/316 |
| 4,276,756 | 7/1981 | Livesay | 62/503 |
| 4,291,548 | 9/1981 | Livesay | 62/503 |
| 4,354,362 | 10/1982 | Schumacher et al. | 62/474 |
| 4,474,034 | 10/1984 | Avery, Jr. | 62/503 |
| 4,474,035 | 10/1984 | Amin et al. | 62/503 |
| 4,496,378 | 1/1985 | Kish | 55/316 |
| 4,509,340 | 4/1985 | Mullally et al. | 62/503 |
| 4,528,826 | 7/1985 | Avery, Jr. | 62/503 |
| 4,581,903 | 4/1986 | Kerry | 62/503 |
| 4,611,473 | 9/1986 | Wada et al. | 62/503 |
| 4,651,540 | 3/1987 | Morse | 62/503 |
| 4,675,971 | 6/1987 | Masserang | 29/422 |
| 4,730,046 | 3/1988 | Inoue | 62/503 |
| 4,756,166 | 7/1988 | Tomasov | 62/509 |
| 4,768,355 | 9/1988 | Breuhan et al. | 62/503 |
| 4,800,737 | 1/1989 | Smith et al. | 62/503 |
| 4,835,986 | 6/1989 | Carlisle, Jr. | 62/503 |

Primary Examiner—Ronald C. Capossela
Attorney, Agent, or Firm—Roger L. May; Charles H. Ellerbrock

[57] ABSTRACT

An accumulator is provided for use with a vehicle air conditioning system. The accumulator comprises a housing having first and second sections, an outlet tube integral with the second section, and a desiccant container. Inlet and outlet openings are formed in the housing through which refrigerant enters and exits the interior chamber defined by the housing. The outlet tube extends from the outlet opening into the interior chamber and terminates in a free end. The desiccant container is mounted in the interior chamber between the housing and the free end of the outlet tube to define a first path between the housing and the desiccant container through which incoming refrigerant may flow. The desiccant container also has a second path therethrough through which incoming refrigerant may flow.

15 Claims, 2 Drawing Sheets

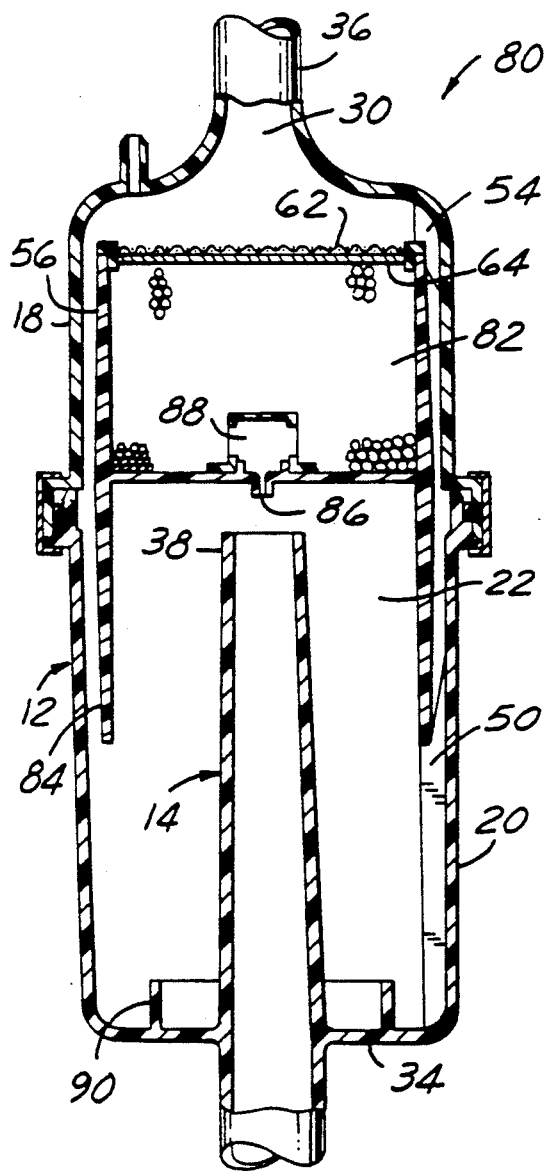
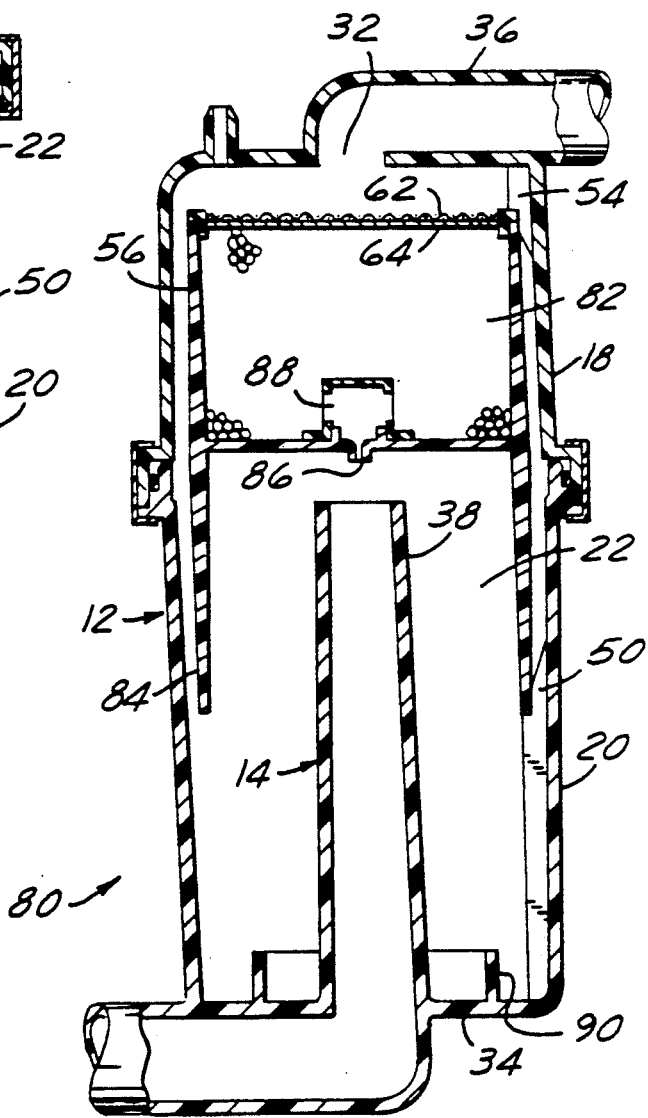
fig-4
fig-5

ACCUMULATOR FOR VEHICLE AIR CONDITIONING SYSTEM

TECHNICAL FIELD

This invention relates to accumulators for air conditioning systems, and more particularly to vehicle air conditioning systems.

BACKGROUND ART

A vehicle air conditioning system conventionally includes a compressor, a condenser, an evaporator, and an accumulator arranged as a refrigerant circuit. The compressor compresses gaseous refrigerant for delivery to the condenser, where the state of the refrigerant changes from gaseous to liquid. The liquid refrigerant then passes to the evaporator, where an air blower circulates air over the evaporator to the vehicle passenger compartment. The consequent heat transfer from the ambient air to the evaporator causes the refrigerant to change to a mostly gaseous state.

The refrigerant then passes from the evaporator to the accumulator. The function of the accumulator is to separate any remaining liquid refrigerant from the gaseous refrigerant, allowing only gaseous refrigerant to return to the compressor. The residual liquid refrigerant eventually turns to a gaseous state and is then returned to the compressor. The accumulator also provides for recovery of lubricating oil contained in the refrigerant, returning a metered amount of the oil to the inlet side of the compressor.

The accumulator normally is an upright cylindrical housing with an inlet opening formed therein and having an outlet tube with its mouth near the top of the accumulator. Refrigerant from the evaporator is introduced into the accumulator through the inlet opening, which may be in the top or in the side of the accumulator housing. Suction created by the compressor draws gaseous refrigerant out of the accumulator through the outlet tube. A desiccant is usually provided to dry the refrigerant as it circulates through the accumulator.

To prevent any liquid refrigerant from entering the outlet tube and being drawn back into the compressor, some structure is typically provided to act as a shield for the mouth of the outlet tube. For example, U.S. Pat. No. 4,768,355 to Breuhan et al., assigned to the assignee of the present invention, discloses an accumulator with a domed baffle which encloses a desiccant for drying the refrigerant. The incoming refrigerant deflects off the domed baffle and flows around the desiccant. The liquid refrigerant pools in the bottom of the accumulator. Gaseous refrigerant exits the accumulator through either of two flow paths, one through the desiccant and a filter, the second through the filter only.

U.S. Pat. No. 4,800,737 to Smith et al., also assigned to the assignee of the present invention, discloses an accumulator having dual flow paths. One of the paths passes through a filter and a pressure regulator assembly, and the other passes only through the pressure regulator assembly. The function of the alternative flow path in this design is to allow for an unrestricted passage for the gaseous refrigerant out of the accumulator in case the filter becomes clogged with contamination. The filter and pressure regulator assembly both add a measurable pressure drop in the flow path, however.

Because the incoming flow of refrigerant has a relatively high velocity, turbulence can be created when the refrigerant contacts the outlet tube shield or other structure provided as an incoming flow deflector. This turbulence may hamper the efficient separation of the liquid from the gaseous refrigerant.

It has been proposed to dampen the incoming flow by filtering the refrigerant through the desiccant, which is mounted for this purpose in the upper part of the accumulator. An example of this design is U.S. Pat. No. 4,354,362 to Schumacher et al., in which all the incoming refrigerant passes through the desiccant. With this design, the liquid level may rise in the desiccant container or in a chamber provided upstream of the desiccant container, for instance when the vehicle air conditioning system is operating under low loads. This may temporarily hinder the passage of gaseous refrigerant through the accumulator.

SUMMARY OF THE INVENTION

It is an object of the present invention to provide an accumulator comprising a housing, an outlet tube extending into the housing, and a desiccant container mounted between the housing and the outlet tube to define a first path between the housing and the desiccant container through which incoming refrigerant may flow, the desiccant container also having a second path therethrough through which incoming refrigerant may flow.

Another object of the present invention is to provide an accumulator of the type described above in which the desiccant container is mounted generally around the mouth of the outlet tube.

Another object of the present invention is to provide an accumulator of the type described above having housing sections that can be joined without application of external heat.

It is another object of the present invention to provide an accumulator of the type described above which can be molded out of plastic.

It is another object of the present invention to provide an accumulator of the type described above which reduces the turbulence generated by the incoming flow of refrigerant.

In carrying out the above objects and other objects of the present invention, an accumulator is provided for use in a vehicle air conditioning system. The accumulator comprises a housing, an outlet tube, and a desiccant container. The housing includes a first section and a second section which are joined together to define an interior chamber. The housing also has an inlet opening through which refrigerant may be introduced into the interior chamber and an outlet opening through which substantially gaseous refrigerant may exit the interior chamber. The outlet tube extends from the outlet opening into the interior chamber and terminates in a free end. The desiccant container is mounted in the interior chamber between the housing and the free end of the outlet tube to define a first path between the housing and the desiccant container through which incoming refrigerant may flow. The desiccant container also has a second path therethrough through which incoming refrigerant may flow.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a front cross-sectional view of a third embodiment of an accumulator according to the present invention; and FIG. 5 is a front cross-sectional view of a fourth embodiment of an accumulator according to the present invention.

BEST MODE FOR CARRYING OUT THE INVENTION

With reference to the drawings, the preferred embodiments of the present invention will be described.

Figure 2:
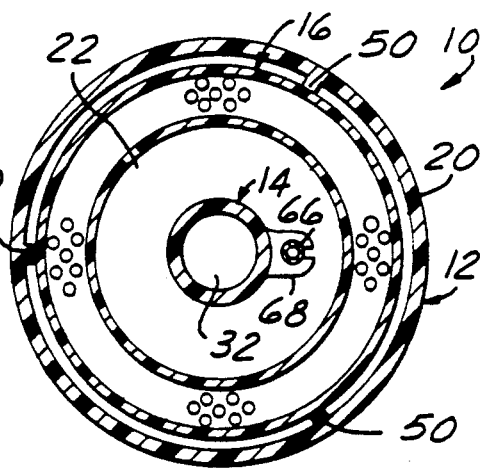
FIG. 2 is a top cross-sectional view taken along line 2—2 of FIG. 1.
Figure 1:
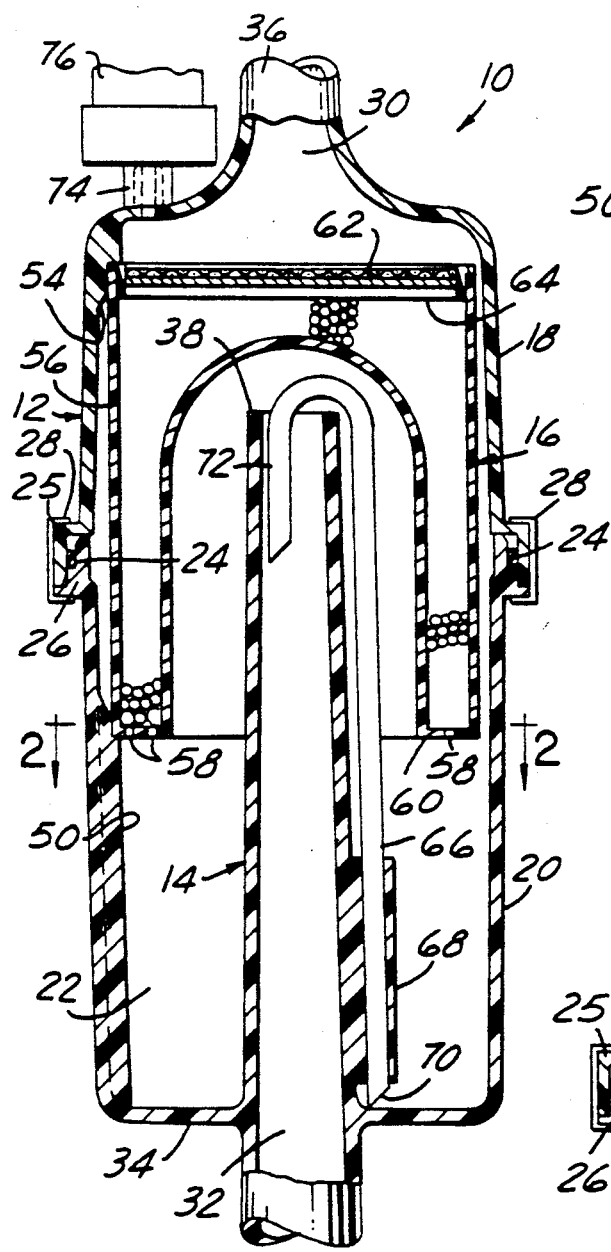
FIG. 1 is a front cross-sectional view of an accumulator according to the present invention for use in a vehicle air conditioning system.

FIGS. 1 and 2 show an accumulator 10 for use in a vehicle air conditioning system. The accumulator 10 comprises a housing 12, an outlet tube 14, and a desiccant cup or container 16.

The housing 12 includes a first or upper section 18 and a second or lower section 20. The housing sections 18 and 20 are preferably a glass mineral reinforced polyester plastic, joined together near the middle of the housing to define an interior chamber 22. The housing sections and their integral components described below can be injection molded, blow molded, or die cast.

The joint between first and second sections 18 and 20 is sealed by a circumferential O-ring 24, which fits between opposite extensions 25 and 26 of the housing sections 18 and 20, respectively. An annular metal band 28 is crimped around the extensions 25 and 26 to complete the seal. Alternatively, vibration welding or a structural adhesive can be used to join the first and second sections 18 and 20. The elimination of a conventional joint requiring the application of external heat allows more flexibility in designing the internal construction of the accumulator. For instance, the internal components can be formed from plastics which might otherwise be distorted by high temperatures.

An inlet opening 30 is formed in the first section 18, and an outlet opening 32 is formed in the geometric center of the end 34 of the second section 20. An inlet fitting or tube 36 in fluid communication with the evaporator (not shown) is integrally molded with the first section 18 and opens into the inlet opening 30.

The outlet tube 14 extends from the outlet opening 32 up into the interior chamber 22 and terminates in a free end 38. The outlet tube 14 is integral with the second section 20 and generally in the form of a slightly tapering cylinder, such that the free end 38 defines a generally circular mouth and is slightly less in diameter than outlet opening 32.

A plurality of support ribs 50 are spaced equalangularly about the interior of the housing 12. As best shown in FIG. 1, three support ribs 50 are integrally molded with the second section 20 of the housing 12 to provide a shoulder upon which the desiccant container 16 is supportable within the interior chamber 22. Three locating ribs 54 are similarly spaced equalangularly about first section 18 and open to the interior of the housing 12. The locating ribs 54 are integrally molded with the first section 18 of the housing, and function to constrain the desiccant container 16 within the interior chamber 22 between the locating ribs 54 and the support ribs 50.

The desiccant container 16 is mounted in the interior chamber 22 substantially within the first section 18 of the housing 12, proximate the inlet opening 30. Because the desiccant container 16 is mounted in the top of the accumulator, it does not displace any liquid that pools in the bottom of the accumulator. This increases the distance between the liquid and the entrance to the outlet tube, thereby decreasing the chance of liquid entering the outlet tube 14. A lower concave portion 56 of the desiccant container 16 is disposed generally around the mouth or free end 38 of the outlet tube 14. The desiccant container 16 is thus positioned between the housing 12 and the free end 38 of the outlet tube 14. The annular space between the housing 12 and the desiccant container 16 defines a first flow path for the incoming refrigerant, as described more fully below. A second parallel flow path is provided for the incoming refrigerant through the desiccant container 16 itself by holes 58 formed in bottom 60 of the desiccant container 16. Alternative or supplemental holes can be formed in the outer surface 56 of the desiccant container 16.

The desiccant container 16 is covered by an outer screen 62 and an underlying filter 64. The screen 62 is made of nylon with approximately a 350 micron mesh size. The filter 64 is preferably a polyester felt pad, and serves to retain a desiccant molecular sieve or other drying agent within the desiccant container 16 so it does not enter into the outlet tube 14 and cause damage to the compressor. The screen 62 and filter 64 are vibration welded or otherwise attached to the top of the desiccant container 16 proximate the inlet opening 30.

An oil return quill 66 is retained adjacent the outlet tube 14 by a snap connector 68 formed integrally with the outlet tube 14. The oil return quill 66 has a first end 70 which rests on or near the bottom 34 of the second section 20. The lower end 70 of the quill 66 may be provided with a filter (not shown). The liquid that accumulates in the lower section 20 is a mixture of liquid refrigerant and oil required for lubrication and cooling of the compressor. The suction created by the compressor draws the oil and refrigerant mixture up through the first end 70 and through the quill 66, after which the oil/refrigerant mixture is metered back through a second end 72 with the vaporous refrigerant to the compressor.

A pressure switch port 74 is provided integral with the first section 18 of the housing 12. The pressure switch port 74 provides a fitting for a pressure switch 76. A charge or service port (not shown) can similarly be provided in either of the housing sections 18 or 20.

The operation of the accumulator 10 will now be described. The refrigerant which circulates through the vehicle air conditioning system, preferably R134a, enters the interior chamber 22 through the inlet opening 30. The incoming refrigerant is initially directed against the screen 62 and the underlying filter 64 covering the desiccant container 16. The screen 62 and the filter 64 dampen the turbulence of the incoming refrigerant. A portion of the refrigerant then flows down the side wall of the first section 18 or through the first path between the housing 12 and the outer surface 56 of the desiccant container 16. Another portion flows through the second path through the desiccant container 16 and out the holes 58. All the liquid refrigerant pools in the bottom of the accumulator, where it is steadily evaporated into the low pressure atmosphere of the accumulator. Gaseous or vaporous refrigerant accumulates in the upper region of the accumulator, and exits the interior chamber 22 through the outlet tube 14 and the outlet opening 32 under the suction created by the compressor.

Figure 3:
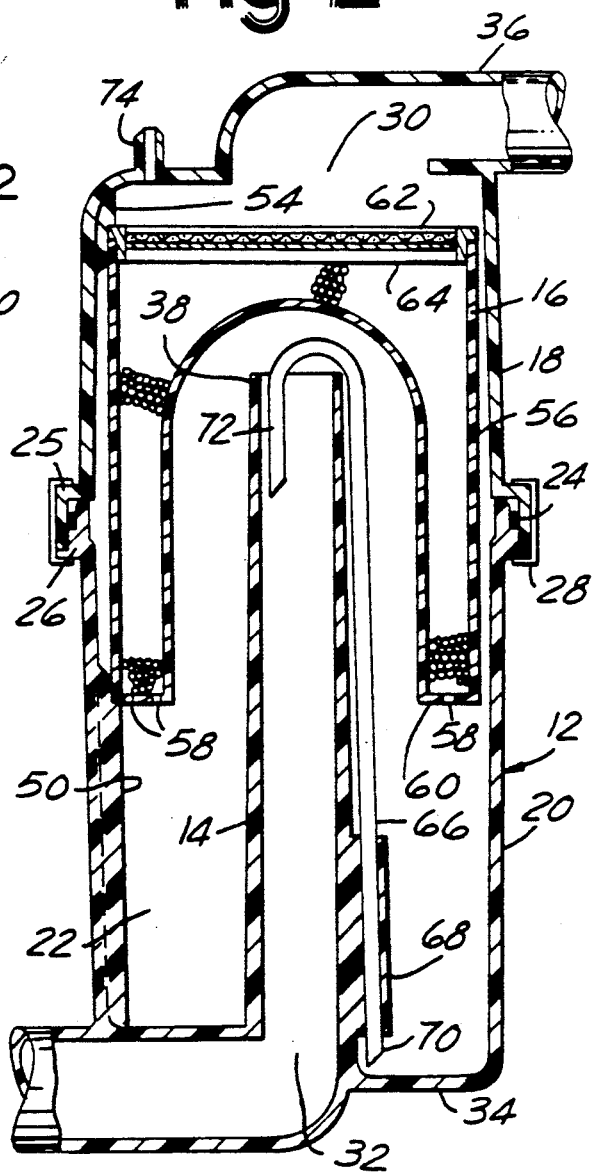
FIG. 3 is a front cross-sectional view of a second embodiment of an accumulator according to the present invention.

FIG. 3 shows an alternative embodiment of the accumulator 10 having a side inlet 30 and side outlet 32 construction. This arrangement is useful, for example, when the vehicle environment with which the accumulator is used imposes space constraints such as a low hoodline. This embodiment is otherwise structurally similar to the embodiment shown in FIGS. 1 and 2, and operates in substantially the same way with the exception that the incoming refrigerant flow is not straight at the screen 62 and filter 64. As on skilled in the art will appreciate, the accumulator of the present invention can be provided with any combination of top or side inlets and bottom or side outlets, without materially affecting performance.

FIGS. 4 and 5 show further alternative embodiments of an accumulator 80 according to the present invention. The desiccant container 82 includes a downwardly extending skirt 84 positioned between the inside of the housing 12 and the free end 38 of the outlet tube 14 with a substantially constant radial clearance to the first section 18 and second section 20. An oil return orifice 86 is located in the bottom of the desiccant container 82 along the central axis of the housing 12. The incoming refrigerant flows through the first path between the housing 12 and the skirt 84, and through the second path through the desiccant container 82 and out oil return orifice 86. Oil is metered back to the compressor as it flows through filter 88 and orifice 86. An integral anti-slosh ring 90 extends into interior chamber 22 from the bottom 34 of the lower section 20. The ring 90 minimizes movement of the liquid once it has accumulated in the bottom of the housing 12.

Connectors can be molded with the inlet tube 36 or the outlet tube 14 in any of the embodiments shown in FIGS. 1-5, for connecting hoses to the accumulator. For example, a threaded tube O-ring, a female spring lock coupling, or a pilot for a hose crimp can be molded onto both the inlet tube 36 and the outlet tube 14.

While the best mode for carrying out the invention has been described in detail, those familiar with the art to which this invention relates will recognize various alternative designs and embodiments for practicing the invention as defined by the following claims.

I claim:

1. An accumulator for use in an air conditioning system, the accumulator comprising:
    a housing including a first section and a second section which together define an interior chamber, the housing having an inlet opening through which refrigerant may enter the interior chamber and an outlet opening through which refrigerant may exit the interior chamber;
    an outlet tube extending from the outlet opening into the interior chamber and terminating in a free end; and
    a desiccant container mounted in the interior chamber between the housing and the free end of the outlet tube to define a first path between the housing and the desiccant container through which incoming refrigerant may flow, the desiccant container also having a second path therethrough through which incoming refrigerant may flow.

2. The accumulator of claim 1 further comprising a plurality of support ribs spaced angularly about the interior of the housing, the desiccant container being supported on the support ribs within the interior chamber.

3. The accumulator of claim 2 wherein the support ribs are attached to the second section of the housing.

4. The accumulator of claim 3 further comprising a plurality of locating ribs spaced angularly about the first section and open to the interior of the housing, the desiccant container being constrained within the interior chamber between the locating ribs and the support ribs.

5. The accumulator of claim 1 further comprising an inlet tube integrally attached to the first section of the housing, the inlet tube opening into the inlet opening.

6. The accumulator of claim 1 wherein the desiccant container is mounted proximate the inlet opening of the housing.

7. The accumulator of claim 1 wherein the desiccant container is mounted substantially within the first section of the housing.

8. The accumulator of claim 1 wherein the first and second sections of the housing are joined together by a weld.

9. The accumulator of claim 1 wherein the first section of the housing is molded.

10. The accumulator of claim 1 wherein the second section of the housing is molded.

11. The accumulator of claim 1 wherein the housing is plastic.

12. The accumulator of claim 1 wherein the outlet tube is integral with the second section of the housing.

13. An accumulator for use in an air conditioning system, the accumulator comprising:
    a housing including a first section and a second section which are joined together to define an interior chamber, the housing having an inlet opening through which incoming refrigerant may enter the interior chamber and an outlet opening through which refrigerant may exit the interior chamber;
    an outlet tube extending from the outlet opening into the interior chamber and terminating in a mouth; and
    a desiccant container mounted in the interior chamber generally around the mouth of the outlet tube and spaced apart from the housing to define a first path between the housing and the desiccant container through which incoming refrigerant may flow, the desiccant container also having a second path therethrough through which incoming refrigerant may flow.

14. An accumulator for use in a vehicle air conditioning system, the accumulator comprising:
    a housing including a molded plastic first section and a molded plastic second section which together define an interior chamber, the housing having an inlet opening through which refrigerant may enter the inlet chamber and an outlet opening through which refrigerant may exit the interior chamber;
    an inlet tube integral with the first section of the housing, the inlet tube opening into the inlet opening;
    an outlet tube integral with the second section of the housing, the outlet tube extending from the outlet opening into the interior chamber and terminating in a free end;
    a plurality of support ribs spaced angularly about the second section and open to the interior of the housing;

a plurality of locating ribs spaced angularly about the first section and open to the interior of the housing; and a desiccant container mounted by the support ribs and by the locating ribs between the housing and the free end of the outlet tube to define a first path between the housing and the desiccant container through which incoming refrigerant may flow, the desiccant container also having a second path therethrough through which incoming refrigerant may flow.

15. An accumulator for use in an air conditioning system, the accumulator comprising:

a housing including a first section and a second section which together define an interior chamber, the housing having an inlet opening through which refrigerant may enter the interior chamber and an outlet opening through which refrigerant may exit the interior chamber;

a plurality of support ribs spaced angularly about the second section of the housing;

a plurality of locating ribs spaced angularly about the first section and open to the interior of the housing;

an outlet tube extending from the outlet opening into the interior chamber and terminating in a free end; and a desiccant container constrained within the interior chamber between the locating ribs and the support ribs to define a first path between the housing and the desiccant container through which incoming refrigerant may flow, the desiccant container also having a second path therethrough through which incoming refrigerant may flow.

* * * * *